United States Patent [19]
Kurosawa et al.

[11] Patent Number: 5,473,494
[45] Date of Patent: Dec. 5, 1995

[54] ELECTRICAL POWER SUPPLY SYSTEM

[75] Inventors: Yukio Kurosawa, Hitachi; Youichi Ohshita, Katsuta; Masaru Watanabe, Hitachi; Isao Nishida, Hitachi; Yoshihito Asai, Hitachi; Tokio Yamagiwa, Hitachi, all of Japan

[73] Assignee: Hitachi, Ltd., Tokyo, Japan

[21] Appl. No.: 942,810

[22] Filed: Sep. 10, 1992

[30] Foreign Application Priority Data

Sep. 13, 1991 [JP] Japan .................... 3-234407

[51] Int. Cl.⁶ .................... H02H 7/22; H02H 3/00
[52] U.S. Cl. .................... 361/3; 361/2; 361/55; 361/58
[58] Field of Search .................... 361/2, 3, 5–13, 361/21, 54, 55, 115–118, 120, 125, 126, 127, 131, 136, 138, 56, 62–66

[56] References Cited

U.S. PATENT DOCUMENTS

| | | | |
|---|---|---|---|
| 3,660,721 | 5/1972 | Baird | 361/63 |
| 4,485,422 | 11/1984 | Takanashi | 361/7 |
| 5,124,872 | 6/1992 | Pham et al. | 361/11 |

Primary Examiner—Howard L. Williams
Assistant Examiner—Ronald W. Leja
Attorney, Agent, or Firm—Antonelli, Terry, Stout & Kraus

[57] ABSTRACT

An electrical power supply system includes an electrical power source system connected to a bus bar and a plurality of electric power transmission systems each connected via circuit breakers to the bus bar. The supply system has overvoltage suppression equipments each installed between the transmission system and the ground. The overvoltage suppression equipment includes a switching device and an impedance connected to the switching device. The switching device in a sound transmission system is closed when the circuit breaker operates in other faulty transmission system, thereby an overvoltage being occurred on the sound system is effectively suppressed.

19 Claims, 7 Drawing Sheets

ELECTRICAL POWER SUPPLY SYSTEM

BACKGROUND OF THE INVENTION

The present invention relates to an electrical power supply system provided with an overvoltage suppression function, and more particularly it relates to an electrical power supply system capable of suppressing an overvoltage arising when a circuit breaker is operated in said power system.

Overvoltages arising when a circuit breaker is operated include a closing switching surge which builds up an overvoltage when a charging voltage in a transmission line at the time of closing undergoes successive reflection as a traveling wave, and an interrupting surge which also builds up an overvoltage when a traveling wave due to a voltage drop in the transmission line at the time of a ground fault interruption undergoes successive reflection. Sometimes, the largest of these overvoltages reaches three times the phase voltage. Heretofore, against such overvoltages, the resistance closing circuit breaker and the resistance interrupting circuit breaker have been utilized in conjunction with the efforts for designing the insulation level of the transmission system sufficiently to withstand such overvoltages.

In order to increase the capacity of electrical power transmission systems in accordance with an increasing demand for a greater power supply, construction plans for a 1000 kV power transmission system have been in progress. In such ultra-high-voltage power transmission systems, it becomes more difficult economically to build a power transmission line which can satisfactorily withstand overvoltages generated when the circuit breaker thereof is operated. Thereby, it is contemplated to design an overvoltage suppression equipment to suppress the overvoltages generated when the circuit breaker is operated to an extent as low as possible so as to enable economical construction of power transmission lines. For example, in a 1000 kV system, it is demanded to hold the overvoltages down less than 1.6 times the phase voltage peak values. By way of example, against the overvoltages arising when a circuit breaker is closed in power transmission systems having a lower voltage than the above, a resistance closing circuit breaker which is closed via a resistance and absorbs the energy of a travelling wave has been employed. This system, however, is not effective for suppressing the overvoltages at the time of interruption. Thereby, a resistance interrupting circuit breaker capable of being interrupted via a resistance also at the time of interruption has been proposed. However, in a puffer-type gas circuit breaker which is most popular nowadays, a resistance current conduction time during interruption is substantially longer as much as about 30 ms. Further, it must withstand the out-of-phase closing and interruption duty which becomes twice as much as the duty voltage for the circuit breaker. Thereby, the resistance thereof becomes inevitably large-sized, and in addition, a complicated delay operation mechanism is required to actuate the resistance closing unit or resistance interrupting unit thereof. Furthermore, a formidable problem of system reliability is always involved therein that a failure of the resistance or the actuating mechanism thereof will result in a bus bar failure then paralyzing the operation of the substation.

Further, the inventors of the present application have found that the overvoltages also arise on the sound or nonfaulty transmission systems, the circuit breakers of which are not operating. However, in the prior art, e.g. Japanese Patent Laid-Open No.Hei-2-146930, Hei-2-106133 etc., the overvoltages arising in the sound transmission systems has not been considered.

SUMMARY OF THE INVENTION

Objects of the present invention are to solve the problems associated with the prior art, to provide an electrical power supply system which is capable of significantly suppressing overvoltages arising therein, and has an extremely greater system reliability.

According to the present invention, an electrical power supply system having an electrical power source system connected to a bus bar and a plurality of electric power transmission systems each connected via circuit breakers to the bus bar, the power supply system comprises, overvoltage suppression equipments each installed in the electric power transmission system and between the transmission system and the ground, the overvoltage suppression equipment including a switching means and an impedance connected to the switching means, the switching means being closed when the circuit breaker opens which is connected to the electric power transmission system except an associated electric power transmission system.

Further, according to the present invention, the power supply system comprises, an overvoltage suppression equipment installed between the bus bar and the ground, the overvoltage suppression equipment including a switching means and an impedance connected to the switching means, the switching means being closed when at least one of the circuit breakers opens.

According to the present invention, the overvoltage suppression equipment connected between the ground and either the bus bar side from the circuit breaker, the transmission line side or on the both sides thereof is interconnected to its electrical power main circuit only when the circuit breaker is opened, thereby the overvoltage suppression level thereof is capable of being decreased significantly by use of this overvoltage suppression equipment. As a result, adverse effects by the overvoltage on the other sound or nonfaulty transmission systems is capable of being minimized thus providing a highly reliable electrical power supply system.

BRIEF DESCRIPTION OF THE DRAWINGS

Further objects, features and advantages of the present invention will become more clear from the following detailed description of a preferred embodiment, shown in the accompanying drawings, wherein.

DETAILED DESCRIPTION OF THE PREFERRED EMBODIMENTS

Figure 1:
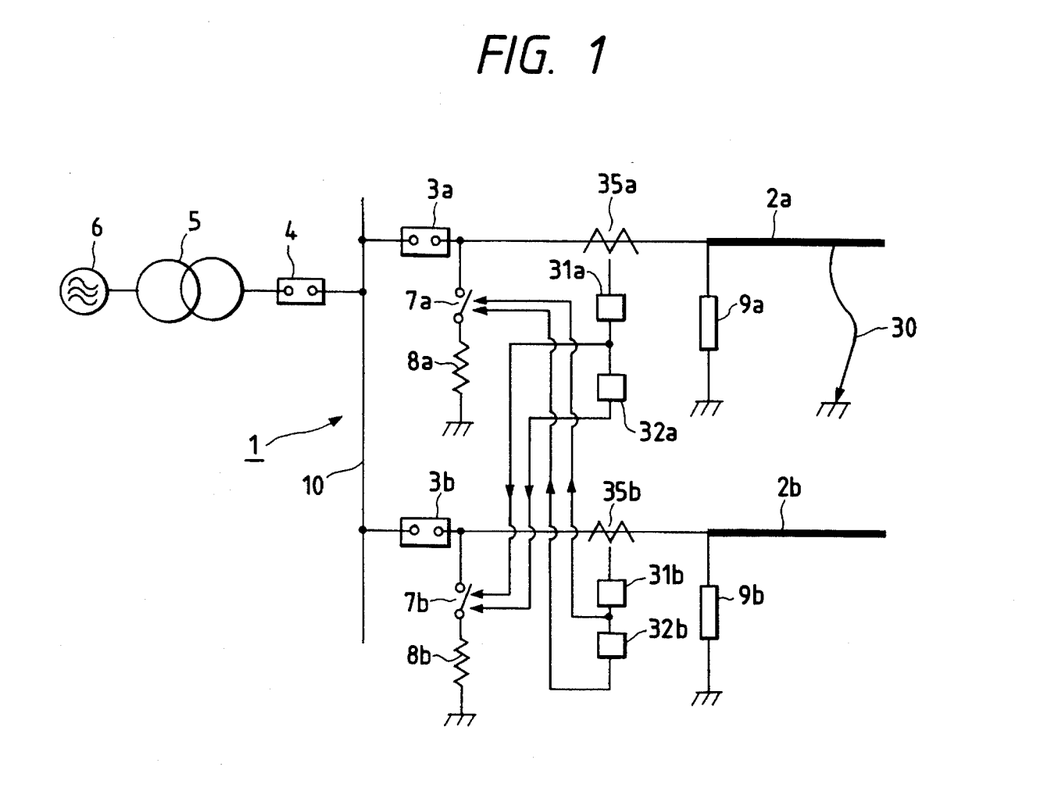
FIG. 1 is a schematic diagram showing one embodiment of the invention.
Figure 2:
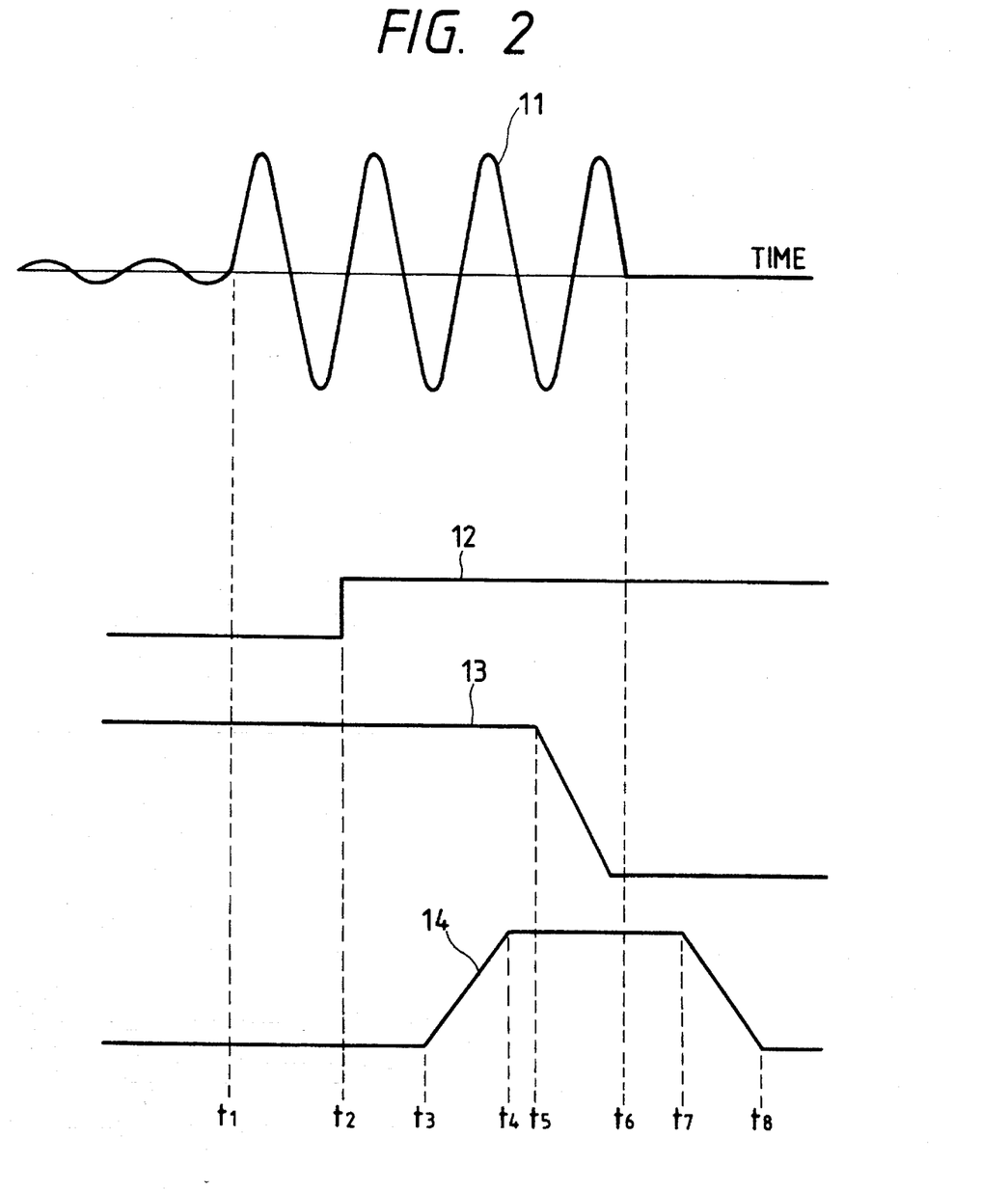
FIG. 2 is an operational characteristic diagram explaining the operation of FIG. 1 the embodiment of the invention.
Figure 3:
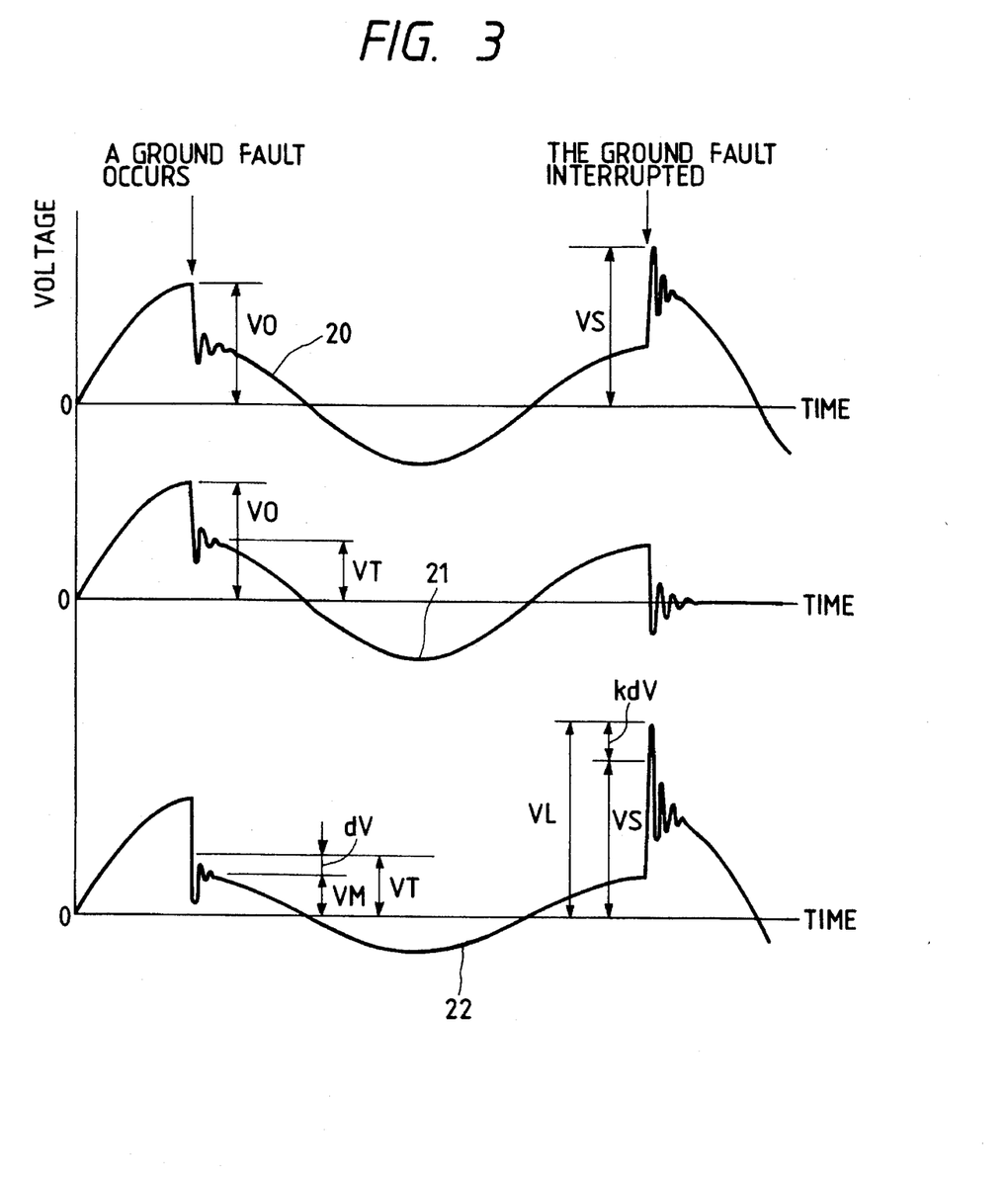
FIG. 3 illustrates voltage characteristic diagrammatical drawings explaining the operation of the embodiment of FIG. 1 of the invention.

FIG. 1 shows one embodiment of the present invention, illustrating an electrical power system 1, in the electrical power source side of which an electrical power transformer 5 connected to a generator 6 is further connected to a bus bar 10 via a circuit breaker 4. To this bus bar 10, two pairs of power transmission lines 2a and 2b are connected through circuit breakers 3a and 3b, respectively. At lead-in portions of the power transmission lines, arrestors 9a and 9b are connected, respectively. Between the ground and respective main circuits connecting circuit breaker 3a or 3b with transmission line 2a or 2b, there are provided resistance 8a or 8b through switching gears 7a or 7b which in conjunction constitute an overvoltage suppressing equipment. If a ground fault 30 occurs on the transmission line 2a, a faulty current 11 (shown in FIG. 2) is detected by a detector 35a such as a current transformer or the like. In response to a signal 12 (shown in FIG. 2) sent from a fault detector 31a such as a relay or the like connected to the detector 35a, first of all, the switch gear 7b of a sound or nonfaulty power circuit is closed with a stroke characteristic 14 as shown in FIG. 2. Then, circuit breaker 3a on the faulty line is opened with a stroke characteristic 13 as shown in FIG. 2. Part of the signal from the fault detector 31a enters a timer 32a which, after a few cycles of intervals, outputs a signal to the switch gear 7b which is designed to open upon reception of the signal. If the ground fault occurs on the transmission line 2b, the switch gear 7a and the circuit breaker 3b are operated by a current transformer 35b, a fault detector 31b and a timer 32b in the same way as described above. Suppose, for example, a ground fault has occurred on one phase of the transmission line 2a near its center. A large ground fault current flows in a direct ground system when there occurs a ground fault, thereby the amplitude of the power source voltage is decreased due to the power source impedance as indicated by a curve 20 in FIG. 3, and the terminal voltage of circuit breaker 3a on the faulty line 2a decreases from VO to VT as indicated by a curve 21. At this moment in a healthy transmission line 2b, a further voltage drop by dV down to a level of VM as indicated by a curve 22 in FIG. 3 is observed at a location corresponding to the faulty point on the faulty transmission line 2a due to electromagnetic induction. Under such conditions, the grounded current is interrupted by the circuit breaker 3a. Then, the electric power source voltage 20 recovers to its original value through jumping of its spike voltage to VS due to transient oscillation in the electric power source system.

On the other hand, the voltage in the interrupted transmission line oscillates reciprocally therein. Also in a sound transmission line in which a further voltage drop by dV has occurred due to electromagnetic induction, the voltage drop thereof oscillates in the transmission line repeating reciprocal reflection. In addition, there occur superposed oscillations induced by the voltage reciprocal oscillations in the faulty transmission line which has been isolated. As a result, a high frequency oscillation extremely greater than dV would be superposed. Thereby, a maximum voltage at a location on the healthy transmission line corresponding to the fault point will increase up to a value Vs+kdV resulting in an excessive surge voltage.

According to the present invention, however, when the circuit breaker is opened, resistance 8b is inserted between the healthy line and the ground, and resistance 8a is interconnected to the faulty line. Thereby, an excessive oscillation in the power source side is damped by the resistance 8b connected to the healthy transmission line reducing the amplitude thereof. The reciprocal voltage oscillation within the healthy transmission line is also damped by the same. Further, because the reciprocating reflection oscillation within the fault transmission line is damped by use of the resistance 8a, electromagnetic induction due to the reciprocating voltage oscillation from the faulty transmission line to the healthy transmission line can be minimized. As a result, the ground interrupting surge becomes extremely smaller compared with that of the prior art.

Figure 4:
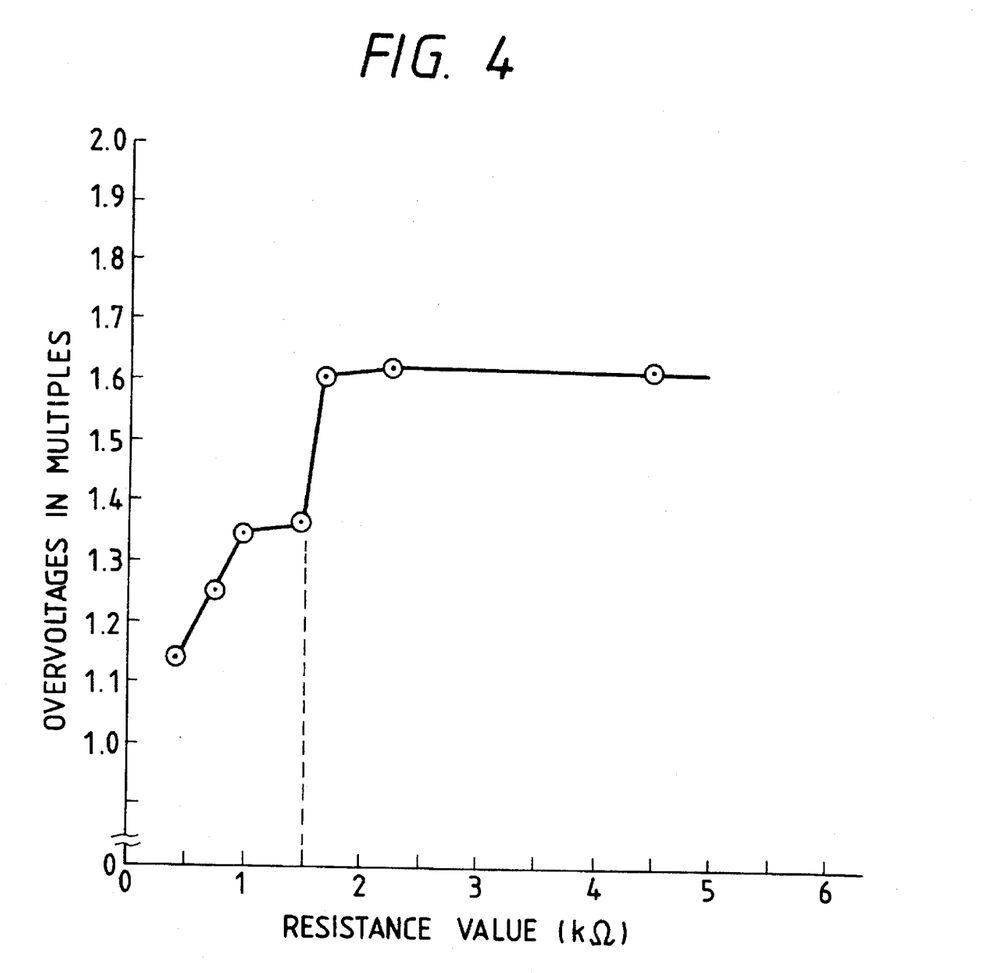
FIG. 4 is a characteristic diagram showing changes in overvoltages in terms of multiples when the values of resistance were changed.

FIG. 4 shows findings on overvoltages in terms of multiples at a location on the healthy phase corresponding to the faulty point, when the resistance of the invention was varied of its value. In each case, multiples are smaller than 1.6 for which no resistance was provided. In particular, it was found that the overvoltages could have been suppressed effectively and satisfactorily at values of resistance of 1.5 kΩ and below.

Figure 5:
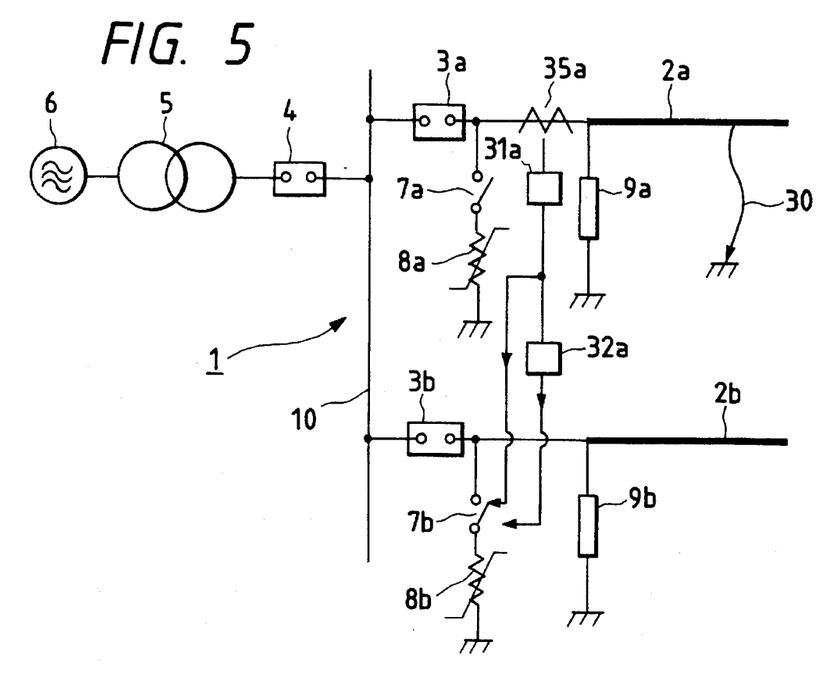
FIG. 5 is a schematic diagram showing a modified embodiment in which an impedance is changed to a nonlinear-resistance.

FIG. 5 shows another preferred embodiment of the invention, where the same symbols as in FIG. 1 indicate the same components or corresponding parts. In this embodiment of the invention, the current transformer, the fault detector and the timer are provided on the transmission line 2b in the same way as the transmission line 2a. (not shown in FIG. 5) In this embodiment of the invention, nonlinear resistance was used for the resistance 8a and 8b for constituting an overvoltage suppression equipment. Needless to mention, the same ones as above are installed in a substation at the remote end thereof. Likewise the above-mentioned one embodiment of the invention, when there occurs a ground fault in one of the phases of a transmission line 2a, thus requiring to isolate the same by interrupting a circuit breaker 3a, a switch gear 7b of an adjacent healthy line is closed prior to the circuit breaker 3a so as to insert a non-linear resistance 8b between the ground and the line thereof. A switch gear located at the remote end is operated likewise to insert a non-linear resistance between the line thereof and the ground.

As a result, transient oscillations of a power source voltage between this side substation and the remote end is suppressed to a lower level by means of the non-linear resistances, and an interruption surge in the center portion of the healthy line can be suppressed sufficiently lower. Then, after a predetermined period of time, the non-linear resistances are isolated by the switch gears to prevent their thermal destruction. The smaller the limiting voltage of the non-linear resistance, the more effective the overvoltage suppression, however, because a travelling wave current in the transmission line is usually less than 10 kA, if a limiting voltage at 10 kA is permitted to be set at 1.4 times or less the peak value of a phase voltage, it becomes certain for the overvoltage to be suppressed under 1.4 times thereof, assuring the effects and advantages of the invention to be achieved for certain.

In the above embodiment of the invention, closing instructions to the switching gears may be given utilizing a tripping instruction to the circuit breaker, to close the same at a high speed such that it may complete its interrupting operation within a minimum period of time required for interrupting the circuit breaker. Thus, without lowering the stability of the electrical power system, overvoltages are capable of being suppressed.

On the other hand, operation of the switch gears is capable of being interlocked with an actuator of the circuit breaker, and the switch gear itself can be installed within a housing of the circuit breaker. Further, in the above embodiment of the invention, in place of the switch gear, a gap device, in particular, a trigger gap device can be utilized. Still further, a semiconductor switch is also capable of being utilized as well. In particular, when a trigger gap device or semiconductor switch which has a fast switching capability such that it permits a resistance or non-linear resistance to be inserted between the line and the ground at rise time of a transient recovery voltage immediately after the interruption of a circuit breaker, is utilized to open the circuit at a high speed, the thermal resistance strength of the resistance or non-linear resistance can be decreased, thus enabling to make the resistance and non-linear resistance more compact-sized. Still further, for the switch gears, a movable type gap device may be utilized the gap of which is shortened to allow discharging only when required.

Further, the above-mentioned switch function devices or switch function elements constituting the switching means may be limited of their operation to a ground fault or short-circuit fault of the transmission line. By such arrangement, superfluous operation thereof can be eliminated thus capable of prolonging their service life. Still further, if a fault occurs only in one phase and only the circuit breakers on the same one phase are operated, all of the switch gears or switch function devices on the related three phases can be operated concurrently. Further, operation thereof can be limited only to the phase the circuit breaker on which has been operated. Furthermore, an opening operation thereof can be effectuated at both ends of the transmission line concurrently.

Figure 6:
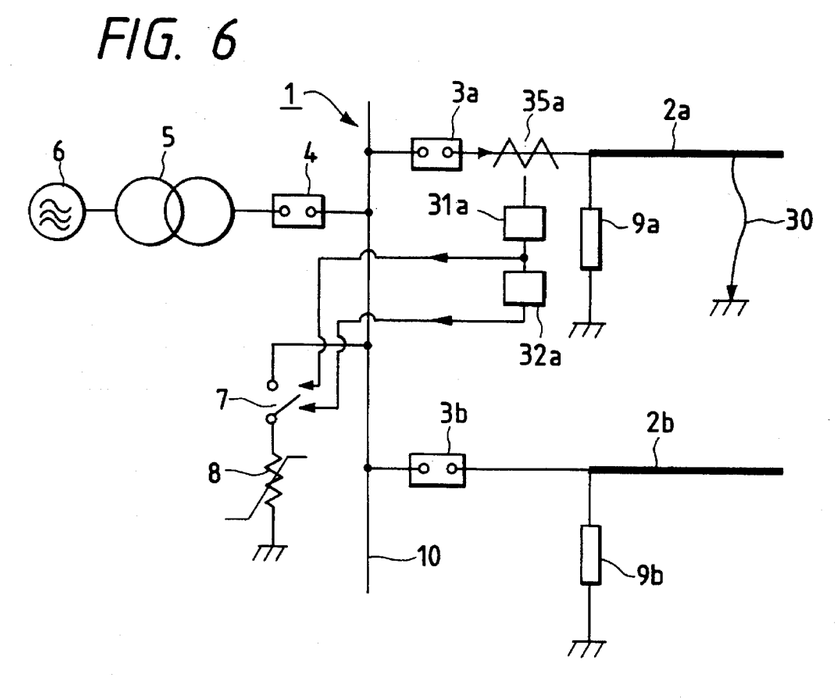
FIG. 6 is a schematic diagram showing another modified embodiment in which a switch gear and a resistance are installed to the side of a bus bar.

FIG. 6 shows still another embodiment of the invention, in which the same symbols as in FIG. 1 indicate the same components or corresponding parts thereof. In this embodiment of the invention, the current transformer, the fault detector and the timer are provided on the transmission line 2b in the same way as the transmission line 2a. (not shown in FIG. 6) In this embodiment of the invention, an overvoltage suppression equipment comprising a switch gear 7 and a resistance 8 is installed to the side of a bus bar as shown in the drawing.

According to this embodiment of the invention, the number of the overvoltage suppression equipment required for installation can be minimized. On the other hand, with respect to the non-linear resistance, it may be provided in a series connection or a parallel connection of a linear resistance and a zinc oxide non-linear resistance. Through such arrangement a more compact-sized non-linear resistance will be provided. Further, these resistances or non-linear resistances may be designed to have a positive temperature coefficient. In particular, when a thermistor having a positive temperature property is utilized, as its electrical resistance value increases with temperatures thereby limiting the input of energy, down-sizing of the resistance or non-linear resistance can be realized.

Hereinabove, the operation of the circuit breaker during the interruption has been described. However, it is also possible to perform closing of the switch gears 7a and 7b prior to the interruption of the circuit breaker, and opening the switch gears immediately after the circuit breaker has completed its opening action. With such arrangements, overvoltages arising at the time of interruption can be also suppressed effectively.

Figure 7:
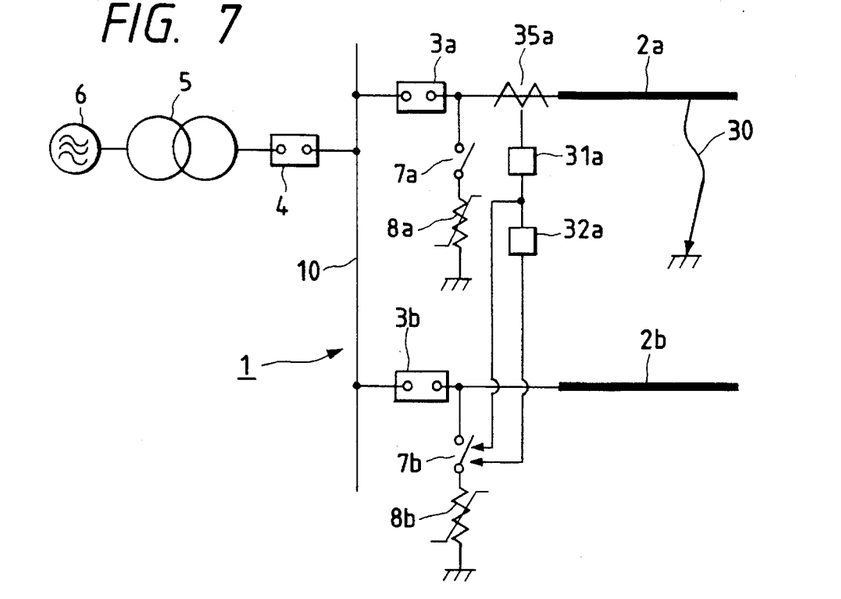
FIG. 7 is a schematic diagram showing a further modified embodiment in which no arresters are provided.

FIG. 7 shows still another embodiment of the invention, in which the same symbols as in FIG. 1 indicate the same components or corresponding parts thereof. In this embodiment of the invention, the current transformer, the fault detector and the timer are provided on the transmission line 2b in the same way as the transmission line 2a. (not shown in FIG. 7) According to this embodiment of the invention, in a substation provided with no arrestors, at a lead-in of a power transmission line, an overvoltage suppression equipment comprising a switch gear 7a or 7b and a resistance 8a or 8b is provided to the side of the power transmission line viewed from a circuit breaker 3a or 3b.

This embodiment of the invention has such an advantage as well that the resistance 8a and 8b can be utilized as lightning arrestors by closing the switch gears 7a and 7b when lightning is anticipated.

Figure 8:
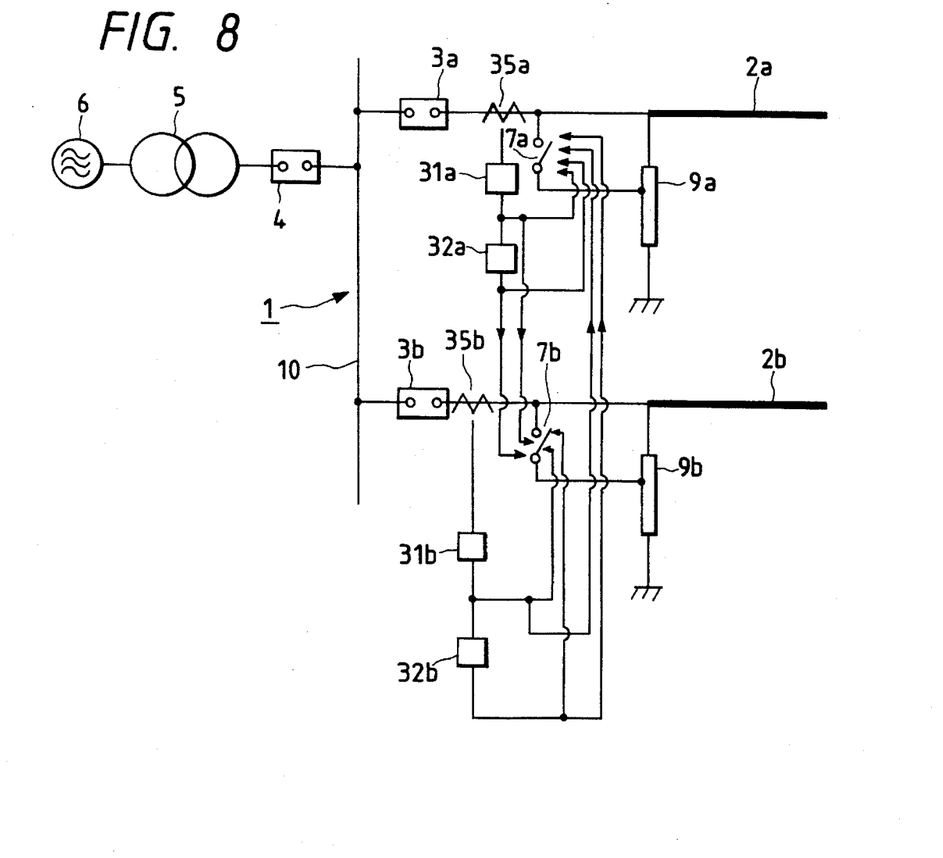
FIG. 8 is a schematic diagram showing another modified embodiment.

FIG. 8 shows still another embodiment of the invention, where the same symbols as in FIG. 1 indicate the same components or corresponding parts thereof. According to this embodiment of the invention, a tap is provided at a lighting arrestor connected to a lead-in of each power transmission line, and in parallel with part of a section defined by the tap, there is provided switch gear 7a or 7b, thus providing a combined use serving as an arrestor and a non-linear resistance as well.

Figure 9:
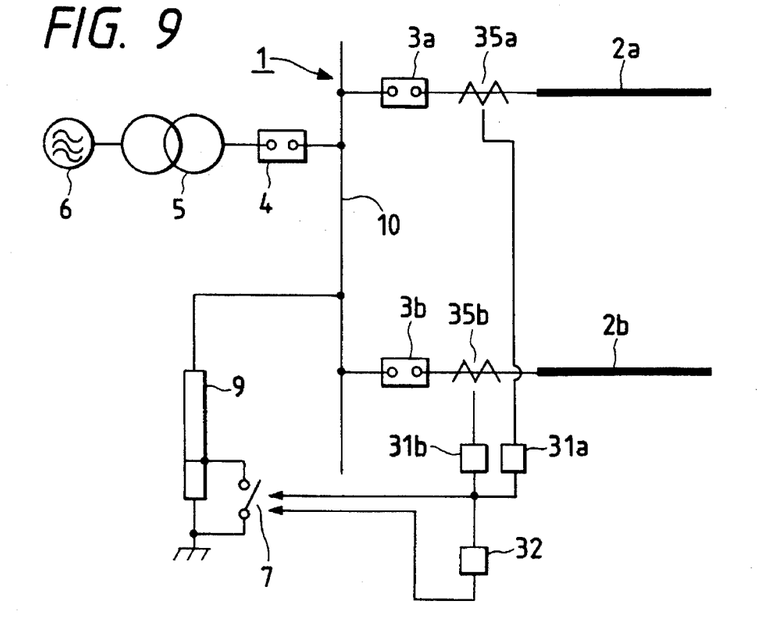
FIG. 9 is a schematic diagram showing a further modified embodiment.

FIG. 9 shows still further embodiment of the invention, where the same symbols as in FIG. 1 denote the same components or corresponding parts. This embodiment is an example of the embodiment of FIG. 8 as applied at a location toward the bus bar side, where a tap and a switch gear are installed at a low voltage side. Thereby, there is an advantage that a lower class of voltage is capable of being utilized for the switch gears.

Figure 10:
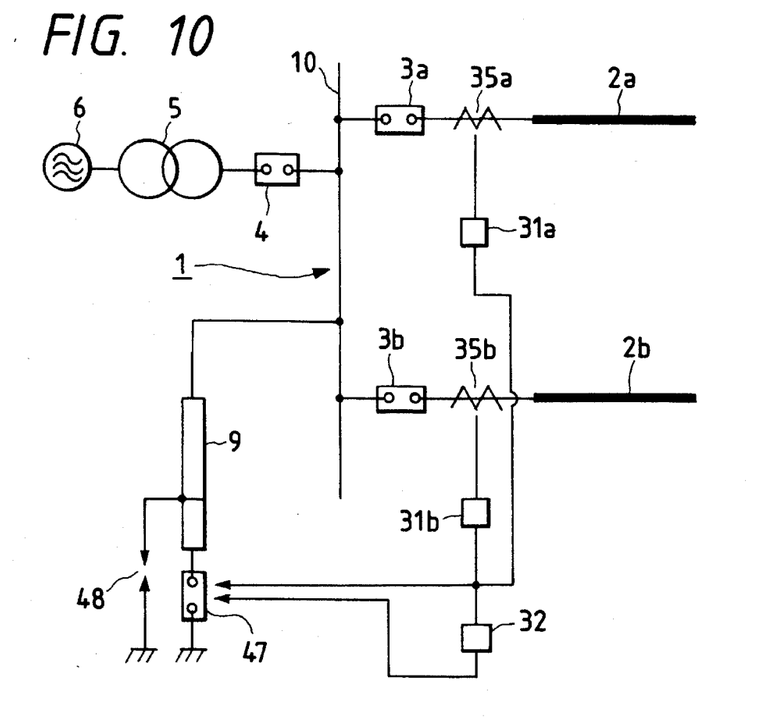
FIG. 10 is a schematic diagram showing still another modified embodiment.

FIG. 10 shows still another embodiment of the invention, where the same symbols as in FIG. 1 indicate the same components or corresponding parts thereof. This embodiment of the invention is another example of application for the embodiment of FIG. 9, where a switch gear 47 is connected in series with a section defined by a tap, while a gap 48 is connected in parallel with the section defined by the tap, and the switch gear 47, further in a case of a fault, a trip instruction to the circuit breaker 3 is divided, and part thereof is given to the switch gear 47 as an interruption instruction. Because a current to flow through the switch gear 47 is as small as a few amperes, the same is capable of being interrupted with a shorter duration of arc than that of and prior to the circuit breaker 3. As a result, a high voltage applied across the gap 48 is discharged as an arc, which means that the gap 48 has been closed, serving likewise the switch gear 7 of FIG. 9. According to this embodiment of the invention, there arises an advantage that, in place of the switch gear the closing operation of which is performed at an extremely high speed, a circuit breaker which has a long record of services and a high reliability can be utilized as a switch gear for this purpose. In particular, a vacuum switch which can interrupt a current with a minimum duration of arc is most suitable for this type of circuit breakers.

In the above-described example of the invention, if anything such as failure of the resistance or non-linear resistance should happen, a continued transmission of electricity should still be possible by isolating the failed component by means of a switch function device or switch function element. Meanwhile, the failed resistance or non-linear resistance can be replaced with a spare component quickly enough not to retard restoration. Further, it is also possible to install two pairs of combination of a switch function device or switch function element and a resistance or non-linear resistance, which are to be utilized by switching therebetween in case of a failure. Through the use of this embodiment of the invention, as hereinabove described, an electrical power system in which an extremely high reliability of the system has been realized is capable of being provided.

As hereinabove set forth, according to the embodiments of the present invention, in an electrical power supply system connected to transmission lines via electrical power circuit breakers, because there are provided linear resistance or non-linear resistance via switching means between at least the bus bar side from the circuit breaker or transmission line side, or on both sides thereof on main circuits and the ground, it becomes possible to interconnect a compact-sized linear resistance having a low electrical resistance or a non-linear resistance capable of lowering its limit voltage near the peak value of the phase voltage, with the main power circuit only when the circuit breaker is operated. Thereby, an overvoltage suppression level of the overvoltage suppression equipment is capable of being reduced significantly, and the down-sizing thereof is also possible because the same is connected to the main circuit only for an extremely short duration of time thus requiring only a small energy resistance. Further, in case the linear resistance or non-linear resistance should fail to operate, they could be isolated with the switch function device or switch function element preventing any troubles to occur in the transmission of electricity, thus capable of essentially increasing the reliability of the electrical power supply system.

Because the overvoltage suppression equipment according to the present invention installed between the bus bar side from the circuit breaker or the transmission line side, or both sides thereof on the main circuit and the ground is arranged to be interconnected to the main circuit only when the circuit breaker is opened, the overvoltage suppression level in the system is capable of being reduced significantly by means of the overvoltage suppression equipment. As a result, adverse effects of overvoltages in a faulty line can be prevented from propagating into other healthy transmission lines, thus an electrical power supply system having a high system reliability is capable of being provided.

While preferred embodiments along with variations and modifications have been set forth for disclosing the best mode and important details, further embodiments, variations and modifications are contemplated according to the broader aspects of the present invention, all as set forth in the spirit and scope of the following claims.

What is claimed is:

1. An electrical power supply system having an electrical power source system connected to a bus bar and a plurality of electric power transmission systems each connected via circuit breakers to said bus bar, said power supply system comprising:

overvoltage suppression equipments each installed in said plurality of electric power transmission systems and between a respective transmission system and ground, said overvoltage suppression equipment including a switching means and an impedance connected to said switching means, at least said switching means of a nonfaulty electric power transmission system being closed prior to the circuit breaker which is connected to a faulty electric power transmission system opening for current interruption.

2. An electrical power supply system according to claim 1, further comprising:

a control means for controlling a closing operation of said switching means of the nonfaulty electric power transmission system to be effected before said circuit breaker of the faulty electric power transmission system has completed current interruption, and an opening operation of said switching means of the nonfaulty electric power transmission system to be effected after a predetermined period of time.

3. An electrical power supply system according to claim 2, wherein said control means controls the closing operation in response to a signal of a short circuit or ground fault occurring on said faulty electric power transmission system.

4. An electrical power supply system according to claim 1, further comprising:

a means for providing a closing instruction to said switching means of the nonfaulty electric power transmission system using a trip instruction to said circuit breaker of the faulty electric power transmission system, and completing a closing operation of said switching means of the nonfaulty electric power transmission system within a minimum interrupting period of time of contact parting time plus minimum arcing time of said circuit breaker of the faulty electric power transmission system.

5. An electrical power supply system according to claim 1, wherein said switching means of the nonfaulty electric power transmission system includes a switching gear capable of carrying out its closing operation at rise time of a transient recovery voltage immediately after a current interruption by said circuit breaker of the faulty electric power transmission system.

6. An electrical power supply system according to claim 1, further comprising:

a means for simultaneously closing said switching means provided on each of three phases of at least one of the nonfaulty and faulty electric power transmission systems at least before said circuit breaker on one of the three phases of at least one of the nonfaulty and faulty electric power transmission systems has completed its current interruption, and for opening said switching means provided on the three phases of the at least one of the nonfaulty and faulty electric power transmission systems after a predetermined of time has elapsed.

7. An electrical power supply system according to claim 1, further comprising:

a means for closing, before said circuit breaker at least on one of three phases lines of said faulty electric power transmission system has completed current interruption, an associated switching means on the same phase line in response to a signal of a short circuit or ground fault occurring at said faulty electric power transmission system, and for opening the same after a predetermined period of time has elapsed.

8. An electrical power supply system according to claim 1, wherein said switching means of at least one of the nonfaulty and faulty electric power transmission systems is interconnected with an actuating mechanism of said circuit breaker of at least one of the nonfaulty and faulty electric power transmission systems such that said switching means is closed before said circuit breaker of at least one of the nonfaulty and faulty electric power transmission systems has completed its current interruption and is opened after a predetermined period of time has elapsed.

9. An electrical power supply system according to claim 1, wherein said switching means of at least one of the nonfaulty and faulty electric power transmission systems is closed before said circuit breaker of at least one of the nonfaulty and faulty electric power transmission systems has completed its current interruption and is opened after a predetermined period of time has elapsed, and said switching means of at least one of the nonfaulty and faulty electric power transmission systems is installed in a container of said circuit breaker.

10. An electrical power supply system according to claim 1, wherein said switching means of the nonfaulty electric power transmission system is closed before said circuit breaker of the faulty electric power transmission system has completed its current interruption and is opened after a predetermined period of time has elapsed, and said impedance is a linear resistance or non-linear resistance.

11. An electrical power supply system according to claim 1, wherein said switching means of the nonfaulty electric power transmission system includes a switching gear connected to said impedance and a discharge gap connected to a tap provided on said impedance, said discharge gap connecting in parallel with said switching gear and a portion of the impedance separated by the tap, and further comprising means for providing an opening instruction to said switching gear using a tripping instruction of said circuit breaker of the faulty electric power transmission system.

12. An electrical power supply system having an electrical power source system connected to a bus bar and a plurality of electric power transmission systems each connected via circuit breakers to said bus bar, said power supply system comprising:

an overvoltage suppression equipment installed between said bus bar and ground, said overvoltage suppression equipment including a switching means and an impedance connected to said switching means, said switching means being closed prior to at least one of said circuit breakers opening for current interruption.

13. An electrical power supply system according to claim 12, further comprising:

a control means for controlling a closing operation of said switching means to be effected before the circuit breaker has completed current interruption, and an opening operation of said switching means to be effected after a predetermined period of time.

14. An electrical power supply system according to claim 13, wherein said control means controls the closing operation in response to a signal of a short circuit or ground fault occurring on said electric power transmission system.

15. An electrical power supply system according to claim 12, further comprising:

a means for providing a closing instruction to said switching means which is being closed using a trip instruction to the circuit breaker which is opening, and completing a closing operation of said switching means which is being closed within a minimum interrupting period of time of contact parting time plus minimum arcing time of the circuit breaker which is opening.

16. An electrical power supply system according to claim 12, wherein said switching means which is being closed includes a switching gear capable of carrying out its closing operation at rise time of a transient recovery voltage immediately after a current interruption by the circuit breaker which is opening.

17. An electrical power supply system according to claim 12, wherein said switching means which is being closed before the circuit breaker which is ppening has completed its current interruption and is opened after a predetermined period of time has elapsed, and said impedance is a linear resistance or non-linear resistance.

18. An electrical power supply system according to claim 12, wherein said switching means which is being closed includes a switching gear connected to said impedance and a discharge gap connected to a tap provided on said impedance, said discharge gap connecting in parallel with said switching gear and a portion of the impedance separated by the tap, and further comprising means for providing an opening instruction to said switching gear using a tripping instruction of the circuit breaker which is opening.

19. An overvoltage suppression equipment for an electrical power source system having an electrical power source system connected to a bus bar and a plurality of electric power transmission systems each connected via circuit breakers to said bus bar, said overvoltage suppression equipment comprising:

a switching means installed between at least one of said plurality of electric power transmission systems and ground, said switching means being closed prior to the circuit breaker which is connected to a faulty electric power transmission system opening for current interruption; and an impedance connected to said switching means.

* * * * *